United States Patent [19]
Sakurai et al.

[11] 3,994,129
[45] Nov. 30, 1976

[54] EXHAUST GAS CLEANING DEVICE FOR INTERNAL COMBUSTION ENGINES

[75] Inventors: Yoshitoshi Sakurai, Kawasaki; Shoichiro Irimajiri, Kawagoe, both of Japan

[73] Assignee: Honda Giken Kogyo Kabushiki Kaisha, Tokyo, Japan

[22] Filed: Dec. 30, 1974

[21] Appl. No.: 537,467

[30] Foreign Application Priority Data
Dec. 29, 1973  Japan.................................. 49-3318

[52] U.S. Cl. .................................. 60/298; 60/321; 60/323; 123/52 MV; 123/122 AB
[51] Int. Cl.[2] .................. F02M 31/00; F02B 75/10
[58] Field of Search ............ 60/282, 323, 321, 298; 123/122 AA, 122 AB, 32 ST, 75 B, 52 MV

[56] References Cited
UNITED STATES PATENTS

| | | | |
|---|---|---|---|
| 2,504,973 | 4/1950 | Gehres................................ | 60/323 |
| 3,413,803 | 12/1968 | Rosenlund ............................ | 60/282 |
| 3,750,403 | 8/1973 | Deutschmann ....................... | 60/323 |
| 3,809,019 | 5/1974 | Stoltman ....................... | 123/122 AB |
| 3,832,984 | 9/1974 | Taguchi........................ | 123/122 AB |

FOREIGN PATENTS OR APPLICATIONS

244,806   9/1969   U.S.S.R................................. 60/323

*Primary Examiner*—Douglas Hart
*Attorney, Agent, or Firm*—Lyon & Lyon

[57] ABSTRACT

An internal-combustion spark-ignition V-8 piston engine has an exhaust gas reaction chamber body positioned between its two banks of cylinders. Each cylinder has a main combustion chamber communicating with an auxiliary combustion chamber by means of a torch opening. A main intake manifold with branching portion over the reaction chamber communicates with main intake passages to supply a lean air-fuel mixture to the main combustion chambers. An auxiliary intake manifold with branching portion directly below the central portion of the branching portion of the main intake manifold communicates with auxiliary intake passages to supply a rich air-fuel mixture to the auxiliary combustion chambers. Exhaust passages supply hot exhaust gases from the cylinders to exhaust gas conduits, each of which receives hot exhaust gases from two adjacent cylinders and projects through an insulated wall of the reaction chamber to discharge into it toward an end wall thereof. An exhaust pipe extends through a remote end wall at the opposite end of the reaction chamber. The top wall of the reaction chamber has an exhaust nozzle formed therein facing the branching portion of the auxiliary intake manifold. Also, the top wall of the reaction chamber has a layer of insulation within it and an opening formed to face both of the branching portions of the main and auxiliary intake manifolds. Within the peripheral wall of the exhaust gas reaction chamber body is formed an annular cooling water jacket, and a heat shielding plate covers the outer bottom portion of this exhaust gas reaction chamber body.

8 Claims, 4 Drawing Figures

EXHAUST GAS CLEANING DEVICE FOR INTERNAL COMBUSTION ENGINES

This invention relates to internal combustion, spark-ignition piston engines of the type having an auxiliary combustion chamber associated with each main combustion chamber and connected thereto through a torch opening. A spark plug associated with each auxiliary combustion chamber ignites a relatively rich mixture therein to project a torch flame through the torch opening into the main combustion chamber to burn the relatively lean mixture therein.

This invention relates to improvements over the inventions disclosed in the copending applications of Sakurai et al, Ser. No. 487,998, filed July 12, 1974, entitled "EXHAUST GAS REACTION CHAMBERS FOR INTERNAL COMBUSTION ENGINE" and Ser. No. 511,809, filed Oct. 3, 1974, entitled "EXHAUST GAS EMISSION CONTROL DEVICE FOR MULTI-CYLINDER ENGINES". Those prior applications are incorporated herein by reference. The present invention employs an improved exhaust gas reaction chamber body to substantially reduce thermal expansion of the structure and to protect the engine body from thermal strain, as well as to more effectively heat the air-fuel mixtures introduced into their respective combustion chambers for better engine performance and less pollutants in the engine exhaust.

In conventional exhaust gas emission control devices for internal combustion engines, the reaction chamber is located downstream from the exhaust manifold, that is, downstream from the junction of exhaust gases from all the cylinders. In such a case, there is necessarily a relatively long distance between the engine cylinders and the reaction chamber, so that the temperature of the exhaust gas lowers significantly before reaching the reaction chamber. This undesirable lowering of the temperature of the exhaust gases is particularly noticeable under engine start-up conditions, when the reaction chamber takes so much time to reach the desired heat intensity that the necessary oxidation reactions to minimize the production of unburned hydrocarbons and carbon monoxide are not carried out to the desired extent. By utilizing a construction as will herein be described, the beneficial effect of maintaining the exhaust gases at a relatively high temperature for a relatively long period of time before discharge can be achieved without subjecting the exhaust gas reaction chamber body or the engine body to harmful thermal strain. Furthermore, heat from the exhaust gases can be used to very effectively raise the temperature of incoming air-fuel mixtures for more efficient combustion.

Important objects of this invention are to provide an exhaust gas emission control device for a multi-cylinder internal combustion engine which is easily constructed, which is capable of uniformly treating the exhaust gas from each cylinder without subjecting either the exhaust gas reaction chamber body or the engine body to harmful thermal strain, and which can more effectively heat air-fuel mixtures introduced into their respective combustion chambers for better engine performance and less pollutants in the engine exhaust.

Other objects and advantages will appear hereinafter.

Figure 1:
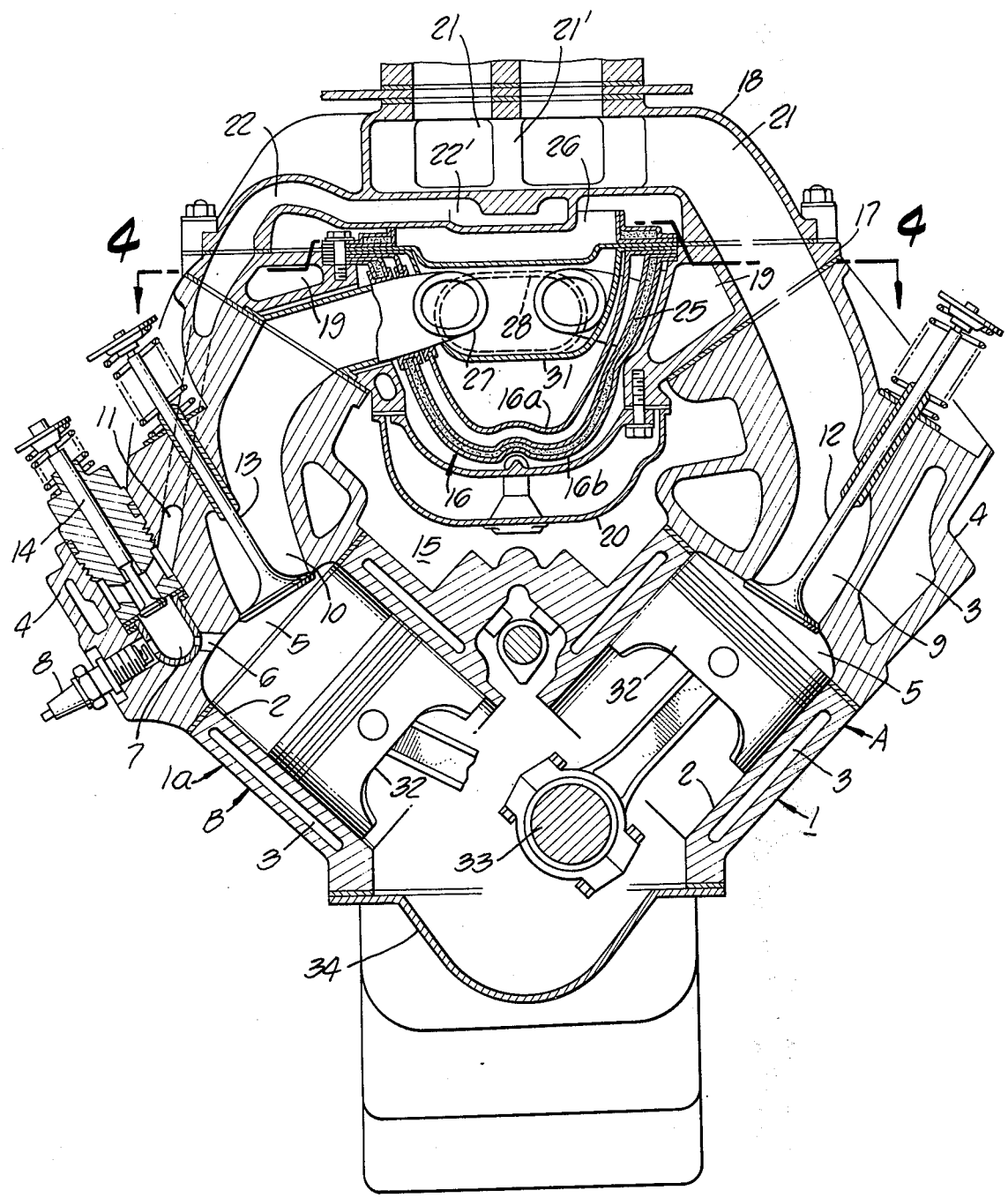
FIG. 1 is a sectional elevation showing a preferred embodiment of this invention.
Figure 2:
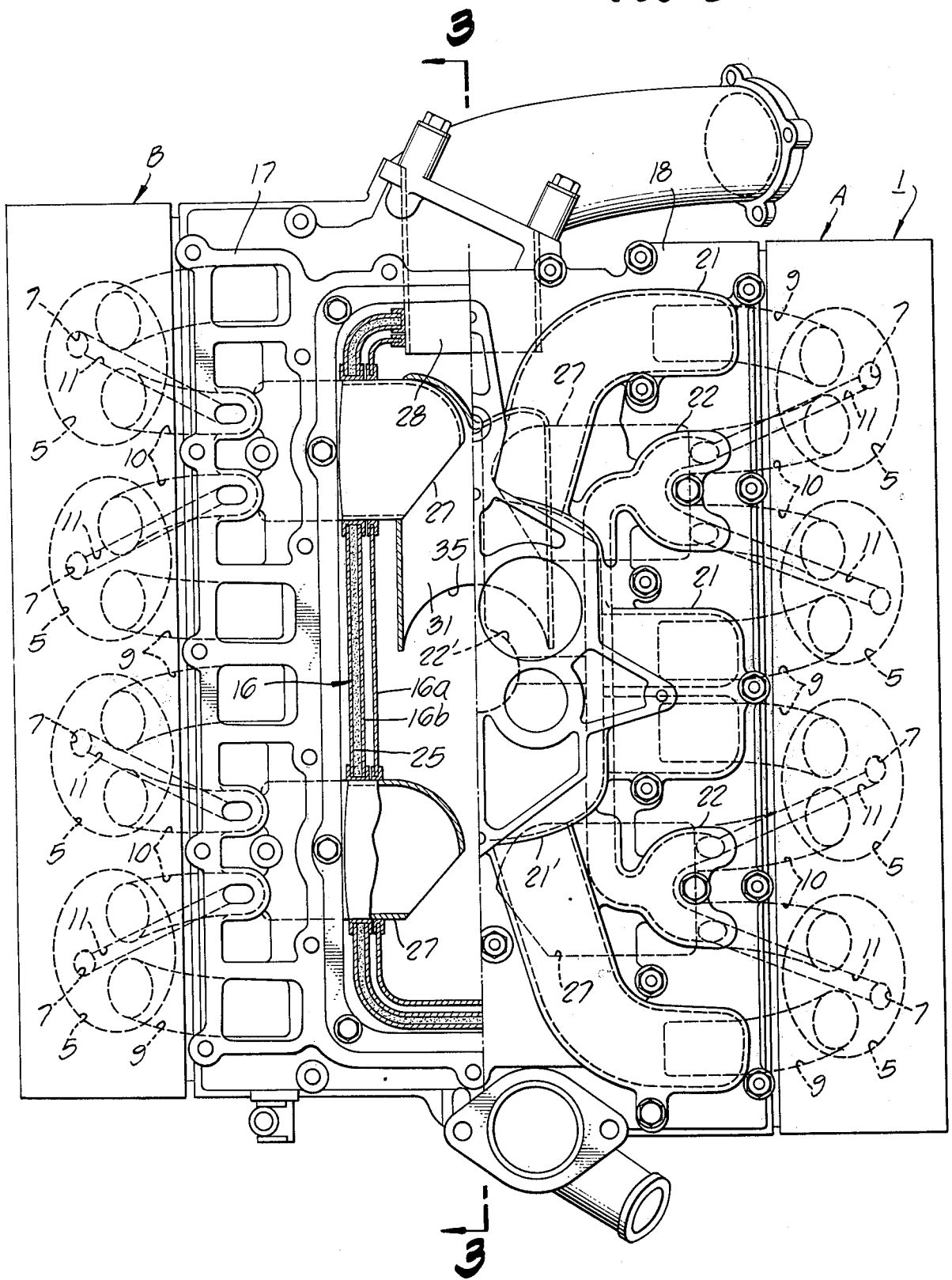
FIG. 2 is a plan view partly broken away.
Figure 3:
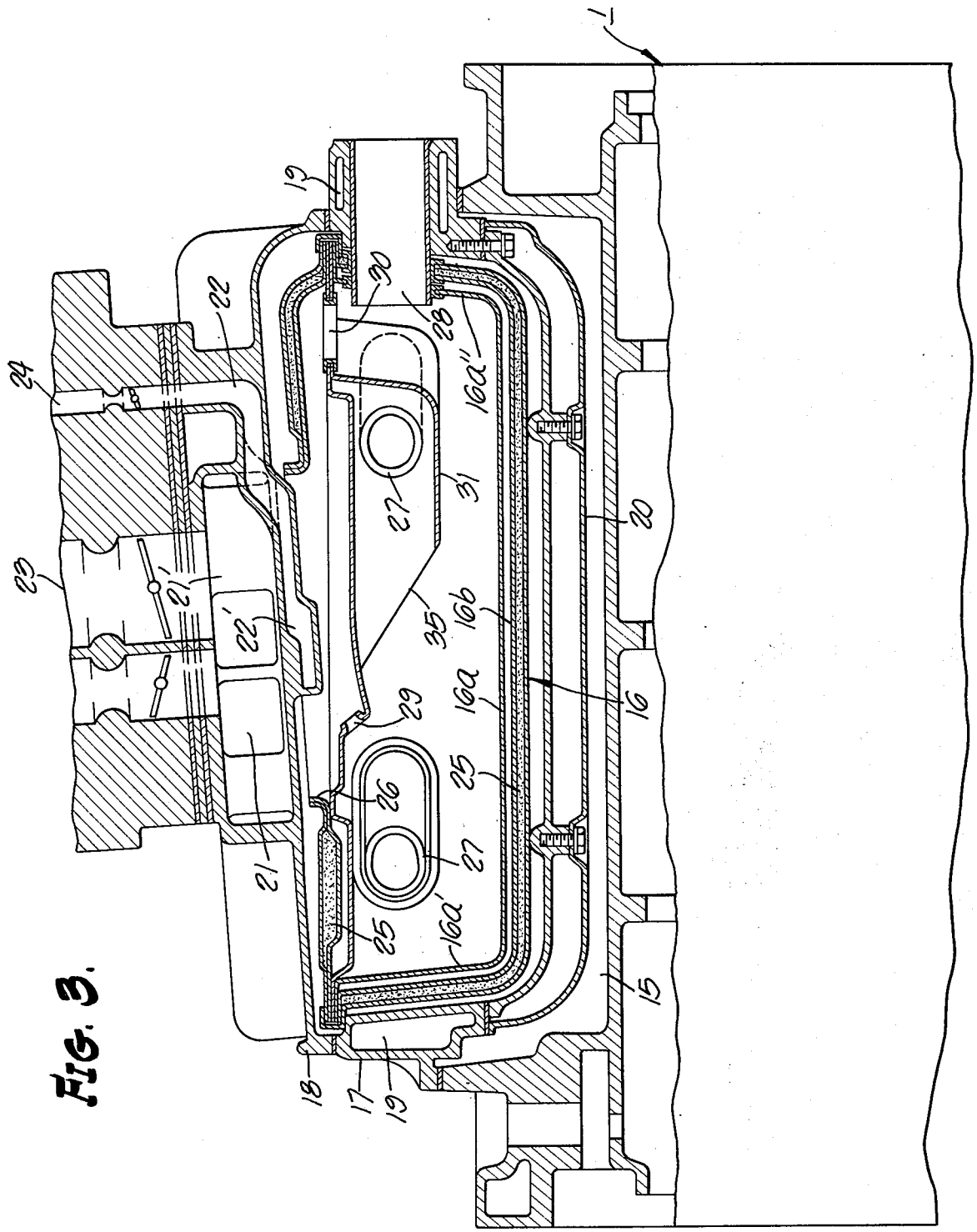
FIG. 3 is a sectional elevation taken along the line 3—3 as shown in FIG. 2.
Figure 4:
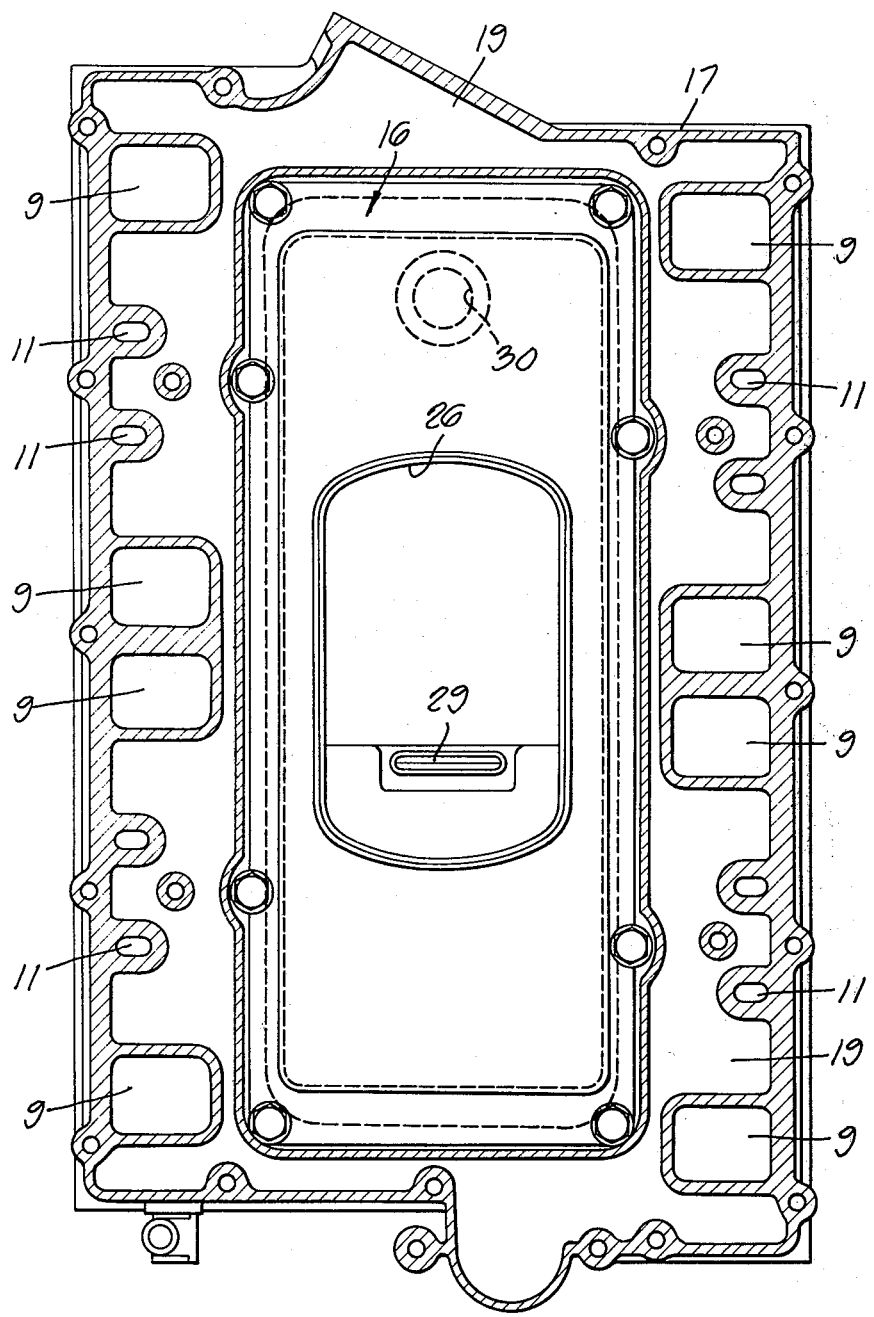
FIG. 4 is a sectional plan view taken along the line 4—4 as shown in FIG. 1.

Referring to the drawings, the V-8 internal combustion engine generally designated 1 comprises two banks, A and B, of cylinders 2 arranged in the shape of the letter V, with a cooling jacket 3 formed within the engine body 1a. Each bank of cylinders has a cylinder head 4. Each cylinder has a main combustion chamber 5 and an auxiliary combustion chamber 7 connected thereto by a torch opening 6. A spark plug 8 communicates with the auxiliary chamber 7. A main intake passage 9 and an exhaust passage 10 communicate with each main combustion chamber 5. An auxiliary intake passage 11 communicates with the auxiliary combustion chamber 7. The main intake passage 9 is controlled by the main intake valve 12, and the exhaust passage 10 is controlled by the exhaust valve 13. The auxiliary intake valve 14 controls the auxiliary intake passage 11. All of the valves are operated by conventional valve actuating mechanisms.

Extending longitudinally within the V-shaped space 15 formed by the two cylinder banks A and B is an exhaust gas reaction chamber body 17 which accommodates a reaction chamber 16 having a top opening 26 closed by a closure member 18. The reaction chamber 16 is formed of an inner casing 16a and an outer casing 16b which surrounds the inner casing and takes the form of a heat shielding structure with its wall formed hollow to receive a heat insulating layer 25. Exhaust conduits 27 pass through each side wall of the reaction chamber 16, the outside end of each conduit being connected to two exhaust passages 10 of adjacent cylinders which have exhaust timings differing from each other. The inside end of each exhaust conduit 27 is directed toward the rear end wall 16a' to require exhaust gases to reverse their direction of movement at the rear end wall 16a' before ultimately escaping through the single exhaust pipe 28 in the opposite end wall 16a''.

An exhaust gas induction member or shroud 31 is positioned within the reaction chamber 16 and this shroud extends from a location near the exhaust pipe 28 to its open end 35 which slants upward from approximately one-third the distance from end wall 16a'' to rear end wall 16a' to midway between the two walls 16a' and 16a''. Two of the exhaust conduits 27 extend into the interior of the shroud 31, while the other two exhaust conduits 27 extend into the reaction chamber passed the open end 35 of the shroud 31. The shroud 31 insures that exhaust gases discharged from the conduits 27 near the exhaust pipe 28 initially travel in a direction away from the exhaust pipe 28. The construction just described has the beneficial effect of maintaining the exhaust gases at a relatively high temperature for a relatively long period of time before discharge through the exhaust pipe 28 leading to a silencer, not shown.

Formed within the peripheral wall of the exhaust gas reaction chamber body 17 is a cooling water jacket 19. The cooling water jacket 19 is connected to the cooling water passages 3 formed as a part of the engine body 1a. In addition, a heat shielding plate 20 is arranged to cover the bottom portion of the exhaust gas reaction chamber body 17. Formed as a part of the closure member 18 are a main intake manifold 21 connecting with the intake passages 9 formed in the engine heads 4 and an auxiliary intake manifold 22 connecting with the auxiliary intake passages 11. The auxiliary intake manifold 22 has a branching portion 22' which is located above the reaction chamber 16 approximately midway between the rear end wall 16a' and the opposite end wall 16a''. The main intake manifold 21 has a branching portion 21' which is directly above the branching portion 22' of the auxiliary intake manifold 22. The main intake manifold 21 connects at its top end with a main carburetor 23, and the auxiliary intake manifold 22 connects at its top end with an auxiliary carburetor 24. The main carburetor 23 is adjusted so as to produce a lean air-fuel mixture, while the auxiliary carburetor 24 is adjusted so as to produce a rich air-fuel mixture.

The reaction chamber 16 has a top wall structure which has a portion of its outer casing 16b formed with the opening 26 in a position opposite to the branching portions 21' and 22' of the main and auxiliary intake manifolds 21 and 22, respectively. Formed in the top wall of the inner casing 16a are an exhaust nozzle 29 directed toward the branching portion 22' of auxiliary intake manifold 22 and an outlet 30 situated between the exhaust pipe 28 and the shroud 31.

In the drawings, reference number 32 designates pistons; 33, a crank shaft; and 34, a crank case.

In operation, a lean air-fuel mixture produced in the main carburetor 23 during suction strokes of the engine 1 is distributed through the main intake manifold 21 and its branching portion 21' to the main intake passages 9 and is inducted into each main combustion chamber 5 when the intake valves 12 are open. A rich air-fuel mixture produced in the auxiliary carburetor 24 is distributed through the auxiliary intake manifold 22 and its branching portion 22' to the auxiliary intake passages 11 and is inducted into each auxiliary combustion chamber 7 when the valves 14 are open. At the end of the compression stroke in each cylinder, the rich air-fuel mixture in the auxiliary combustion chamber 7 is ignited by a spark plug 8 forming a flame which passes through the torch opening 6 to burn the lean mixture in the main combustion chamber 5, thus enabling the engine 1 to start its expansion stroke. In this manner, the engine is run with an air-fuel mixture of an extremely lean overall air-fuel ratio, producing exhaust gases containing very limited amounts of unburned components, which are further minimized in the following manner.

During the exhaust strokes, the exhaust gases from each of the engine cylinders 2 are emitted through its respective exhaust passage 10 to one of the exhaust conduits 27 and then into the inner casing 16a of the reaction chamber 16 without any substantial reduction in temperature and at reduced speed so that the inner casing 16a is heated quickly to its activation temperature and any unburned components of the exhaust gases can readily react with high temperature excess air evenly contained therein and be largely eliminated.

Most of the exhaust gases thus burned again in the inner casing 16a flow beneath the shroud 31 into the exhaust pipe 28 while a portion of the exhaust gases ejects through the exhaust nozzle 29, first heating the branching portion 22' of the auxiliary intake manifold 22 and subsequently heating the branching portion 21' of the main intake manifold 21 so that the lean and rich air-fuel mixtures formed respectively in the main and auxiliary carburetors 23 and 24 are heated rapidly and vaporization of fuel in the mixtures is expedited. However, the branching portions 21' and 22' of the main and auxiliary intake manifolds 21 and 22 are insulated from the inner casing 16a by the top wall portion of the outer casing 16b so that the air-fuel mixtures passing through the branching portions 21' and 22' are not heated to such a great degree as to excessively reduce the volumetric or charging efficiency when drawn into the engine cylinders 2 for combustion.

Though some heat transmission from the reaction chamber 16 to the exhaust gas reaction chamber body 17 is unavoidable despite the heat shielding structure of the outer casing 16b of the reaction chamber 16, the exhaust gas reaction chamber body 17 is subjected to limited thermal expansion as it is continuously cooled by cooling water circulating through the water jacket 19 formed in the peripheral wall of the exhaust gas reaction chamber body 17. Further, heat radiated from the bottom portion of the exhaust gas reaction chamber body 17 is shielded by the heat shielding plate 20 so as not to heat the engine body 1a and cause harmful thermal strain therein.

From the foregoing description, it will be understood that this invention makes it possible to direct exhaust gases from all the cylinders 2 of the V-shaped multi-cylinder engine 1 into a reaction chamber 16 positioned between the banks, A and B, of cylinders 2 of the engine 1 with little drop in exhaust gas temperature and to prolong the stay of the exhaust gases in the reaction chamber 16 for maximum oxidation effect. The reaction chamber 16 is heated quickly immediately after starting of the engine in order to cause the exhaust gases to react uniformly and effectively, and thus provide a reduction in the quantity of harmful components contained in the gases discharged into the atmosphere. Also, since the intake manifolds 21 and 22 are formed within the closure member 18 of the exhaust gas reaction chamber body 17, the intake and exhaust systems of the engine are confined in the V-shaped groove 15 defined by the two banks, A and B, of the engine cylinders 2, thus enabling compact construction of the engine as a whole. Moreover, the cooling water jacket 19 formed within the peripheral wall of the reaction chamber body serves to substantially reduce the thermal expansion of the exhaust gas reaction chamber body 17 and the cooling water jacket 19, along with the heat shielding plate 20, which shields the engine body 1 from heat radiated from the bottom portion of the exhaust gas reaction chamber body 17, serves to protect the engine body from harmful thermal strain. In addition, the simple annular form of the cooling water jacket 19 enables the exhaust gas reaction chamber body 17 to be relatively easily constructed by casting.

Furthermore, the provision of the branching portions 21' and 22' of the intake manifolds 21 and 22, respectively, along with the heat insulating layer 25 within the top wall of the outer casing 16b of the reaction chamber 16, its top opening 26 and the exhaust nozzle 29 facing said branching portions 21' and 22', insures that the lean and rich air-fuel mixtures passing through those branching portions 21' and 22', respectively, can be heated to predetermined extents by the exhaust gases, resulting in more efficient engine performance and less pollutants in the engine exhaust.

Having fully described our invention, it is to be understood that we are not to be limited to the details herein set forth, but that our invention is of the full scope of the appended claims.

We claim:

1. In an internal-combustion spark-ignition piston engine having a plurality of cylinders arranged in two banks in a V shape, the improvement comprising in combination: an exhaust gas reaction chamber body positioned between the two banks of cylinders, a reaction chamber accommodated in said exhaust gas reaction chamber body, a plurality of exhaust conduits connected to receive hot exhaust gases from the cylinders and each having a discharge end communicating with said reaction chamber, a cooling water jacket formed within the walls of said exhaust gas reaction chamber body, and a heat shielding plate covering a bottom portion of said exhaust gas reaction chamber body.

2. In an internal-combustion spark-ignition piston engine having a plurality of cylinders each provided with a main combustion chamber and an auxiliary combustion chamber connected by a torch opening, the improvement comprising in combination: an exhaust gas reaction chamber body arranged on one side of the engine body, a reaction chamber accommodated in said exhaust gas reaction chamber body, a main intake manifold formed within the top wall of said exhaust gas reaction chamber body communicating with said main combustion chambers, an auxiliary intake manifold formed within the top wall of said exhaust gas reaction chamber body communicating with said auxiliary combustion chambers, said main intake manifold having a branching portion above said reaction chamber, said auxiliary intake manifold having a branching portion directly below the central portion of said branching portion of said main intake manifold, said reaction chamber having an exhaust nozzle directed toward said branching portion of said auxiliary intake manifold.

3. The combination set forth in claim 2 in which the cylinders are arranged in two banks in a V shape with said reaction chamber positioned between them.

4. The combination set forth in claim 2 in which the reaction chamber is covered by a closure member within which are formed said main intake manifold, along with its branching portion, and said auxiliary intake manifold, along with its branching portion.

5. In an internal-combustion spark-ignition piston engine having a plurality of cylinders arranged in two banks in a V shape, the improvement comprising in combination: an exhaust gas reaction chamber body positioned between the two banks of cylinders, a reaction chamber accommodated in said exhaust reaction chamber body, a plurality of exhaust conduits connected to receive hot exhaust gases from the cylinders and each having a discharge end communicating with said reaction chamber, an intake manifold formed within the top wall of said exhaust gas reaction chamber body having a branching portion above said reaction chamber, a plurality of intake passages for conducting air-fuel mixtures to said cylinders communicating with said intake manifold, said reaction chamber having a heat-insulating layer within at least the top wall thereof and an opening formed to face said branching portion of said intake manifold.

6. The combination set forth in claim 5 in which the reaction chamber is covered by a closure member within which is formed said intake manifold along with its branching portion.

7. In an internal-combustion spark-ignition piston engine having a plurality of cylinders each provided with a combustion chamber, the improvement comprising in combination: an exhaust gas reaction chamber body arranged on one side of the engine body, a reaction chamber accommodated in said exhaust gas reaction chamber body, a first intake manifold formed within the top wall of said exhaust gas reaction chamber body communicating with the combustion chambers, a second intake manifold formed within the top wall of said exhaust gas reaction chamber body communicating with the combustion chambers, said first intake manifold having a branching portion above said reaction chamber, said second intake manifold having a branching portion directly below the central portion of said branching portion of said first intake manifold, said reaction chamber having an exhaust nozzle directed toward said branching portion of said second intake manifold.

8. In an internal-combustion spark-ignition piston engine having a plurality of cylinders arranged in two banks in a V shape, each bank of cylinders having a cylinder head, the improvement comprising in combination: an exhaust gas reaction chamber body positioned between the two banks of cylinders, said exhaust gas reaction chamber body being connected to the cylinder heads and traversing the area between the cylinder heads, a reaction chamber accommodated in said gas reaction chamber body, a plurality of exhaust conduits connected to receive hot exhaust gases from the cylinders and each having a discharge end communicating with said reaction chamber, a cooling water jacket formed within the walls of said exhaust gas reaction chamber body, and a heat shielding plate covering a bottom portion of said gas reaction chamber body.

* * * * *